(12) United States Patent
Yoshimura et al.

(10) Patent No.: US 6,780,543 B2
(45) Date of Patent: Aug. 24, 2004

(54) ALUMINUM OR ALUMINUM ALLOY-BASED LITHIUM SECONDARY BATTERY

(75) Inventors: Seiji Yoshimura, Hirakata (JP); Hiroshi Nakajima, Hirakata (JP); Maruo Kamino, Katano (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 204 days.

(21) Appl. No.: 10/040,433

(22) Filed: Jan. 9, 2002

(65) Prior Publication Data
US 2002/0192559 A1 Dec. 19, 2002

(30) Foreign Application Priority Data

Feb. 14, 2001 (JP) .................................. 2001-036260
Feb. 20, 2001 (JP) .................................. 2001-042927

(51) Int. Cl.$^7$ .............................................. H01M 4/66
(52) U.S. Cl. .................... 429/245; 429/233; 429/234; 429/241; 429/242
(58) Field of Search ............................. 429/233, 234, 429/241, 242, 245

(56) References Cited

U.S. PATENT DOCUMENTS 6,190,803 B1 * 2/2001 Tomiyama et al. ......... 429/245
6,447,957 B1 * 9/2002 Sakamoto et al. .......... 429/242
2003/0155409 A1 * 8/2003 Dockus et al. .............. 228/245

FOREIGN PATENT DOCUMENTS

JP  6-196169  7/1994
JP  6-70159   9/1994

OTHER PUBLICATIONS

Chemical Composition of Aluminum Alloys, www.egyptalum.com.*
Larry J. Krause, et al., Elsevier Journal of Power Sources 68 (1997) pp. 320–325.
Wishivender K Behl, et al., Elsevier Journal of Power Sources 72 (1998) pp. 132–135.

* cited by examiner

Primary Examiner—Dah-Wei Yuan
(74) Attorney, Agent, or Firm—Westerman, Hattori, Daniels & Adrian, LLP

(57) ABSTRACT

A first lithium secondary battery of the present invention is formed by placing at least a positive electrode, a negative electrode, and a non-aqueous electrolyte in a battery case in which a positive electrode connecting member to which the positive electrode is connected and a negative electrode connecting member to which the negative electrode is connected are electrically separated, wherein said positive electrode connecting member is composed of clad material comprising one of aluminum or aluminum alloy and one of austenitic stainless steel or ferrite stainless steel, and the aluminum or aluminum alloy in the clad material is in the positive electrode side.

6 Claims, 3 Drawing Sheets

ALUMINUM OR ALUMINUM ALLOY-BASED LITHIUM SECONDARY BATTERY

BACKGROUND OF THE INVENTION

1. Field of the Invention

The present invention relates generally to a lithium secondary battery formed by placing at least a positive electrode, a negative electrode, and a non-aqueous electrolyte in a battery case wherein a positive electrode connecting member to which the positive electrode is connected and a negative electrode connecting member to which the negative electrode is connected are electrically separated, and a lithium secondary battery provided with a positive electrode in which a positive electrode material is adhered to a current collector, a negative electrode, and a non-aqueous electrolyte.

2. Description of the Related Art

As a secondary battery having high power and high energy density, lithium secondary batteries featuring high electromotive force derived from oxidation/reduction of lithium in the non-aqueous electrolyte have come into wide use.

Examples of such lithium secondary batteries include a coin-type lithium secondary battery wherein a separator 3 impregnated with non-aqueous electrolyte solution is sandwiched between a positive electrode 1 in which a positive electrode material is adhered to a positive electrode current collector 1a and a negative electrode 2 in which a negative electrode material is adhered to a negative electrode current collector 12, and placed in a battery case 10. The positive electrode 1 is connected to a positive electrode connecting member 11 in the battery case 10 via the positive electrode current collector 1a whereas the negative electrode 2 is connected to a negative electrode connecting member 12 via the negative electrode current collector 2a. An insulation packing 13 composed of polypropylene or the like is provided around the positive electrode connecting member 11 and the negative electrode connecting member 12, the positive electrode connecting member 11 is bent to seal the space between the positive electrode connecting member 11 and the negative electrode connecting member 12 as shown in FIG. 1.

In such lithium secondary battery, stainless steel or aluminum has been generally used as the positive electrode connecting member 11 in the battery case 10, and stainless steel has been generally used as the negative electrode connecting member 12 because aluminum gets alloyed with lithium when aluminum is used.

In the above-mentioned lithium secondary battery, when the positive electrode connecting member 11 is composed of aluminum, there have remained problems that the positive electrode connecting member 11 can not be fully bent to seal the space between the positive electrode connecting member 11 and the negative electrode connecting member 12, thus moisture comes into the battery can 10 from the sealed portion, hence storage characteristics is degraded.

On the other hand, when the positive electrode connecting member 11 is composed of stainless steel, there have remained problems that the stainless steel used as the positive electrode connecting member 11 corrodes away by the non-aqueous electrolyte solution. Especially, when cobalt-lithium oxide, nickel-lithium oxide, or manganese-lithium oxide having a spinel structure is used as the positive electrode material to obtain a lithium secondary battery having high voltage, the stainless steel used as the positive electrode connecting member 11 corrodes away more intensively, thus the storage characteristics of the lithium secondary battery is remarkably degraded.

In the ordinary lithium secondary batteries, aluminum foil, foamed aluminum, and the like have been used as the positive electrode current collector 1a of the positive electrode 1.

However, when charge/discharge is carried out repeatedly to the lithium secondary battery using the positive electrode 1 in which the positive electrode material is adhered to the positive electrode current collector 1a consisting of aluminum foil or foamed aluminum, there have remained problems that the positive electrode material separates from the positive electrode current collector 1a, contact between the positive electrode material and the positive electrode current collector 1a is degraded, thus discharge capacity is gradually decreased, and hence sufficient charge/discharge cycle performance is not attained.

SUMMARY OF THE INVENTION

An object of the present invention is to bend a positive electrode connecting member in order to seal easily and properly a space between the positive electrode connecting member and a negative electrode connecting member in a lithium secondary battery formed by placing at least a positive electrode, a negative electrode, and a non-aqueous electrolyte in a battery case wherein the positive electrode connecting member to which the positive electrode is connected and the negative electrode connecting member to which the negative electrode is connected are electrically separated. Additional object is, in such lithium secondary battery, to prevent the positive electrode connecting member from corroding away by non-aqueous electrolyte solution, thus to improve storage characteristics of the lithium secondary battery even in a case in which cobalt-lithium oxide, nickel-lithium oxide, or manganese-lithium oxide having a spinel structure is used as a positive electrode material to obtain the lithium secondary battery having high voltage.

Another object of the present invention is, in the lithium secondary battery provided with the positive electrode in which the positive electrode material is adhered to the positive electrode current collector, the negative electrode, and the non-aqueous electrolyte, to prevent the positive electrode material from exfoliating from the positive electrode current collector when charge/discharge is carried out repeatedly so that the positive electrode material and the positive electrode current collector contact stably, thus to prevent discharge capacity from gradually decreasing for charge/discharge, hence to improve charge/discharge cycle performance of the lithium secondary battery.

A first lithium secondary battery of the present invention is formed by placing at least a positive electrode, a negative electrode, and a non-aqueous electrolyte in a battery case in which the positive electrode connecting member to which the positive electrode is connected and the negative electrode connecting member to which the negative electrode is connected are electrically separated, wherein said positive electrode connecting member is composed of clad material comprising one of aluminum or aluminum alloy and one of austenitic stainless steel or ferrite stainless steel, and the aluminum or aluminum alloy in the clad material is set in the positive electrode side.

As the above-mentioned first lithium secondary battery, when the clad material comprising one of aluminum or aluminum alloy and one of austenitic stainless steel or ferrite stainless steel is used as the positive electrode connecting member, strength of the clad material is higher compared with the case where only aluminum is used, thus the positive electrode connecting member is properly bent in order to seal fully the space between the positive electrode connecting member and the negative electrode connecting member. As a result, moisture is prevented from coming into the battery can from a sealed portion, hence storage characteristics of the lithium secondary battery is improved.

As the above-mentioned first lithium secondary battery, when the aluminum or aluminum alloy in the positive electrode connecting member which is composed of the clad material is set in the positive electrode side, the positive electrode connecting member is prevented from corroding away by the non-aqueous electrolyte solution even in a case in which cobalt-lithium oxide, nickel-lithium oxide, or manganese-lithium oxide having the spinel structure is used for the positive electrode of the lithium secondary battery to obtain the lithium secondary battery having high voltage. In the clad material, a resistant alloy is formed in the interface between one of aluminum or aluminum alloy and one of austenitic stainless steel or ferrite stainless steel, thus even in the case where aluminum or aluminum alloy in the positive electrode side is damaged for the contact with the positive electrode current collector, the austenitic stainless steel or the ferrite stainless steel is prevented from corroding away by the non-aqueous electrolyte solution owing to the resistant alloy, hence storage characteristics of the lithium secondary battery is improved.

When aluminum-manganese alloy is used as the aluminum alloy in the clad material, the alloy having superior resistance is formed in the interface between the aluminum manganese alloy and one of austenitic stainless steel or ferrite stainless steel, thus the austenitic stainless steel or the ferrite stainless steel is further prevented from corroding away by the non-aqueous electrolyte solution, hence the storage characteristics of the lithium secondary battery is further improved.

Examples of the austenitic stainless steel in the clad material include SUS316L, SUS316, SUS304L, SUS304, SUS201, SUS310S, SUS321, SUS347, and SUSXM7, and at least one of SUS316L, SUS316, SUS304L, SUS304 is preferably used. Examples of the ferrite stainless steel include SUS430, SUS430F, and SUS434, and at least one of SUS430 and SUS434 is preferably used.

The first lithium secondary battery is characterized in that the clad material comprising one of aluminum or aluminum alloy and one of austenitic stainless steel or ferrite stainless steel is used as the positive electrode connecting member to which the positive electrode is connected, and that the aluminum or aluminum alloy in the clad material is set in the positive electrode side. The positive electrode, the negative electrode, and the non-aqueous electrolyte used in the lithium secondary battery are not especially limited, but well-known material which have been generally used can be used.

A second lithium secondary battery of the present invention is provided with a positive electrode in which a positive electrode material is adhered to a positive electrode current collector, a negative electrode, and a non-aqueous electrolyte, wherein the positive electrode current collector consists of aluminum alloy which is containing 0.1 to 10 wt % of manganese and has a space member.

In the second lithium secondary battery, the aluminum alloy containing 0.1 to 10 wt % of manganese is used as the positive electrode current collector for the following reasons. When the amount of the manganese contained in the aluminum alloy is not more than 0.1 wt %, strength of the positive electrode current collector becomes weak, and the ability of the positive electrode current collector to hold the positive electrode material becomes weak, thus the contact of the positive electrode material to the positive electrode current collector is decreased when charge/discharge is carried out repeatedly, hence charge/discharge cycle performance is degraded. On the other hand, when the amount of the manganese contained in the aluminum alloy is not less than 10 wt %, the manganese in the aluminum alloy is likely to elute into the non-aqueous electrolyte, thus the resistance of the positive electrode current collector to the non-aqueous electrolyte is decreased, hence, the charge/discharge cycle performance is degraded.

As the above-mentioned second lithium secondary battery, when the positive electrode current collector consisting of the aluminum alloy containing 0.1 to 10 wt % of manganese and having the space member is used, the positive electrode material is held strongly in the positive electrode current collector, thus even in a case in which the charge/discharge is carried out repeatedly, the positive electrode material fully contacts with the positive electrode current collector, hence discharge capacity is prevented from decreasing, as a result, the charge/discharge cycle performance of the lithium secondary battery is improved.

In the second lithium secondary battery, as the positive electrode current collector having the space member, the positive electrode current collector having one type of structure selected from lath including wire lath or metal lath, and sintered member, foamed member, and aggregation of wire material which are having a filling space can be used. Especially, when metal lath is used as the positive electrode current collector, conductivity of the positive electrode current collector is improved, and the positive electrode material is held strongly in the positive electrode current collector.

As the aluminum alloy constituting the positive electrode current collector, an aluminum alloy containing 0.1 to 10 wt % of manganese and at least one element selected from copper, magnesium, and zinc is preferably used. When such aluminum alloy is used, the strength of the positive electrode current collector is further improved, thus the positive electrode material is held more strongly in the positive electrode current collector, hence, the charge/discharge cycle performance of the lithium secondary battery is further improved.

In adding at least one element selected from copper, magnesium, and zinc into the aluminum alloy, when the amount is too small, these elements do not effect sufficiently. On the other hand, when the amount is too large, the resistance of the aluminum alloy toward the non-aqueous electrolyte is decreased. Therefore, the amount of at least one element selected from copper, magnesium, and zinc to be added to the aluminum alloy is preferably set in the range of 0.1 to 2 wt %, and more preferably, 0.1 to 1 wt %.

The second lithium secondary battery is characterized in that the positive electrode current collector constituted of the above-mentioned aluminum alloy and having the space member is used. The positive electrode material, the negative electrode material, and the non-aqueous electrolyte used in the lithium secondary battery are not especially limited, but well-known material which have been generally used can be used.

These and other objects, advantages and features of the invention will become apparent from the following descrip-

DESCRIPTION OF THE PREFERRED EMBODIMENTS

The first lithium secondary battery according to the examples of the present invention will be specifically illustrated. Further, comparative examples will be taken to make it clear that the lithium secondary batteries of the examples are improved in storage characteristics. It should be appreciated that the first lithium secondary batteries according to the present invention are not particularly limited to those in the following examples, and various changes and modifications may be made in the invention without departing from the spirit and scope thereof.

EXAMPLE A1

Figure 1:
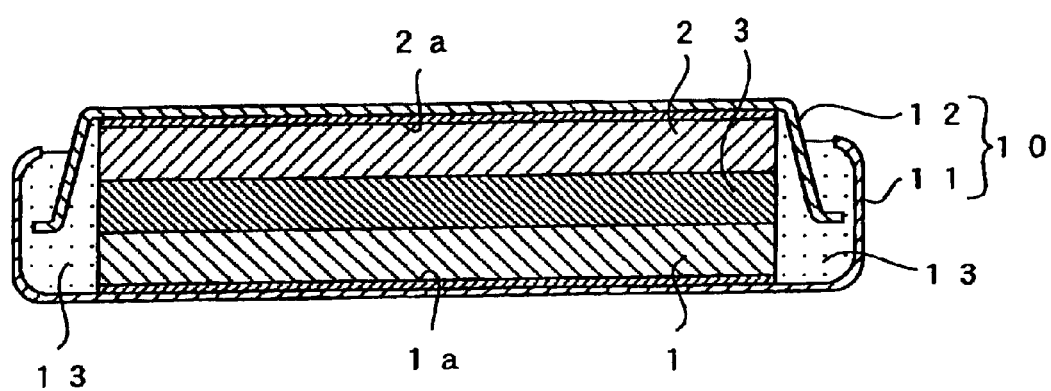
FIG. 1 is a schematic sectional view of a lithium secondary battery according to examples and comparative examples of the invention.

In the example A1, a positive electrode and a negative electrode fabricated in the following manner, and a non-aqueous electrolyte solution prepared in the following manner were used to fabricate a flat coin-type lithium secondary battery as shown in FIG. 1.

(Fabrication of Positive Electrode)

In fabricating the positive electrode, 85 parts by weight of LiCoO$_2$ powder as a positive electrode material, 10 parts by weight of carbon powder as a conductive agent, and 5 parts by weight of polyvinylidene fluoride as a binding agent were mixed. N-methyl-2-pyrolidone was further added to the resultant mixture to prepare a slurry. Subsequently, the above-mentioned slurry was applied to one side of the positive electrode current collector 1a made of aluminum having thickness of 20 μm by means of the doctor blade coating method. The slurry on the positive electrode current collector was dried at 150° C. and was then cut to obtain a disk-like positive electrode 1 having a diameter of 17 mm and a thickness of 1.0 mm.

(Fabrication of Negative Electrode)

In fabricating the negative electrode, 95 parts by weight of natural graphite powder as a negative electrode material, and 5 parts by weight of polyvinylidene fluoride as a binding agent were mixed. N-methyl-2-pyrolidone was further added to the resultant mixture to prepare a slurry. Subsequently, the above-mentioned slurry was applied to one side of the negative electrode current collector 2a made of copper having thickness of 20 μm by means of the doctor blade coating method. The slurry on the negative electrode current collector was dried at 150° C. and was then cut to obtain a disk-like negative electrode 2 having the diameter of 17 mm and the thickness of 1.0 mm.

(Preparation of Non-Aqueous Electrolyte Solution)

In preparing the non-aqueous electrolyte solution, a mixed solvent containing ethylene carbonate (EC) and dimethyl carbonate (DMC) in a volume ratio of 1:1 was used. Lithium hexafluorophosphate LiPF$_6$ as solute was dissolved in the mixed solvent in a concentration of 1 mol/l to prepare the non-aqueous electrolyte solution.

(Fabrication of Battery)

In fabricating the battery, as shown in FIG. 1, a microporous film made of polypropylene and impregnated with the above-mentioned non-aqueous electrolyte solution was interposed as a separator 3 between the positive electrode 1 and the negative electrode 2 respectively fabricated in the above-mentioned manners, after which they were contained in a battery case 10 comprising a positive electrode connecting member 11 to which the positive electrode was connected and a negative electrode connecting member 12 to which the negative electrode 2 was connected, and the positive electrode 1 was connected to the positive electrode connecting member 11 via the positive electrode current collector 1a while the negative electrode 2 was connected to the negative electrode connecting member 12 via the negative electrode current collector 2b. A polypropylene insulation packing 13 was provided around the positive electrode connecting member 11 and the negative electrode connecting member 12, the positive electrode connecting member 11 was bent to seal the space between the positive electrode connecting member 11 and the negative electrode connecting member 12, then the positive electrode connecting member 11 and the negative electrode connecting member 12 were electrically insulated from each other by the insulating packing 13 to fabricate a lithium secondary battery having the diameter of 24 mm and the thickness of 3 mm.

Figure 2:
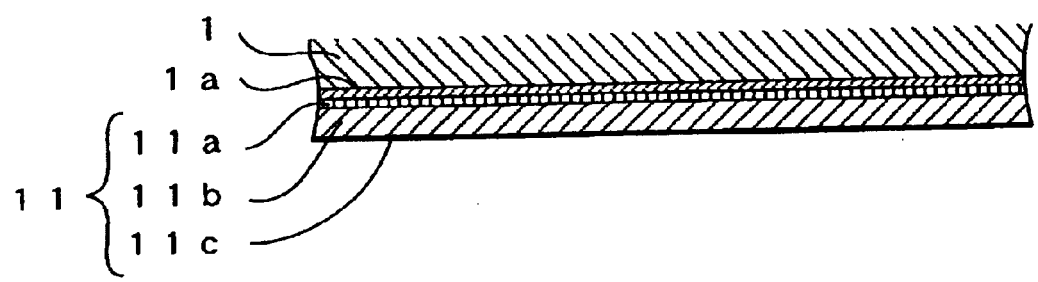
FIG. 2 is a schematic explanatory view showing a state in which a positive electrode is connected to a positive electrode connecting member via a positive electrode current collector according to examples of a first lithium secondary battery of the invention.

In the lithium secondary battery of example A1, the negative electrode connecting member 12 was fabricated by forming a nickel plating layer having the thickness of 0.002 mm outside the austenitic stainless steel of SUS316L having the thickness of 0.25 mm. As the positive electrode connecting member 11, clad material comprising aluminum 11a having the thickness of 0.05 mm and austenitic stainless steel 11b of SUS316L having the thickness of 0.20 mm, wherein the nickel plating layer 11c having the thickness of 0.002 mm was formed on said stainless steel 11b was used, and said aluminum 11a was set to contact with the positive electrode current collector 1a in the positive electrode 1 as shown in FIG. 2.

EXAMPLES A2 TO A10

The examples A2 to A10 were different from the example A1 only in the material of the positive electrode connecting member 11.

In the example A2, as the positive electrode connecting member 11, the clad material comprising the aluminum 11a having the thickness of 0.05 mm and the austenitic stainless steel 11b of SUS316L having the thickness of 0.20 mm, wherein the nickel plating layer 11c was not formed on said stainless steel 11b was used.

In the example A3, as the positive electrode connecting member 11, the clad material comprising the aluminum 11a having the thickness of 0.05 mm and the austenitic stainless steel 11b of SUS316 having the thickness of 0.20 mm, wherein the nickel plating layer 11c having the thickness of 0.002 mm was formed on said stainless steel 11b was used.

In the example A4, as the positive electrode connecting member 11, the clad material comprising the aluminum 11a having the thickness of 0.05 mm and the austenitic stainless steel 11b of SUS304 having the thickness of 0.20 mm, wherein the nickel plating layer 11c having the thickness of 0.002 mm was formed on said stainless steel 11b was used.

In the example A5, as the positive electrode connecting member 11, the clad material comprising the aluminum 11a having the thickness of 0.05 mm and the austenitic stainless steel 11b of SUS304L having the thickness of 0.20 mm, wherein the nickel plating layer 11c having the thickness of 0.002 mm was formed on said stainless steel 11b was used.

In the example A6, as the positive electrode connecting member 11, the clad material comprising the aluminum 11a having the thickness of 0.05 mm and the austenitic stainless steel 11b of SUS201 having the thickness of 0.20 mm, wherein the nickel plating layer 11c having the thickness of 0.002 mm was formed on said stainless steel 11b was used.

In the example A7, as the positive electrode connecting member 11, the clad material comprising the aluminum 11a having the thickness of 0.05 mm and the austenitic stainless steel 11b of SUS310S having the thickness of 0.20 mm, wherein the nickel plating layer 11c having the thickness of 0.002 mm was formed on said stainless steel 11b was used.

In the example A8, as the positive electrode connecting member 11, the clad material comprising the aluminum 11a having the thickness of 0.05 mm and the austenitic stainless steel 11b of SUS321 having the thickness of 0.20 mm, wherein the nickel plating layer 11c having the thickness of 0.002 mm was formed on said stainless steel 11b was used.

In the example A9, as the positive electrode connecting member 11, the clad material comprising the aluminum 11a having the thickness of 0.05 mm and the austenitic stainless steel 11b of SUS347 having the thickness of 0.20 mm, wherein the nickel plating layer 11c having the thickness of 0.002 mm was formed on said stainless steel 11b was used.

In the example A10, as the positive electrode connecting member 11, the clad material comprising the aluminum 11a having the thickness of 0.05 mm and the austenitic stainless steel 11b of SUSXM7 having the thickness of 0.20 mm, wherein the nickel plating layer 11c having the thickness of 0.002 mm was formed on said stainless steel 11b was used.

Except that the positive electrode connecting members 11 comprising the above-mentioned materials were used, the same procedure as that in the example A1 was taken to fabricate each of the lithium secondary batteries of examples A2 to A10.

EXAMPLES A11 TO A12

The examples A11 and A12 were different from the example A1 only in the material of the positive electrode connecting member 11. Specifically, ferrite stainless steel was used as the stainless steel 11b in the clad material.

In the example A11, as the positive electrode connecting member 11, the clad material comprising the aluminum 11a having the thickness of 0.05 mm and the ferrite stainless steel 11b of SUS430 having the thickness of 0.20 mm, wherein the nickel plating layer 11c having the thickness of 0.002 mm was formed on said stainless steel 11b was used.

In the example A12, as the positive electrode connecting member 11, the clad material comprising the aluminum 11a having the thickness of 0.05 mm and the ferrite stainless steel 11b of SUS434 having the thickness of 0.20 mm, wherein the nickel plating layer 11c having the thickness of 0.002 mm was formed on said stainless steel 11b was used.

Except that the positive electrode connecting members 11 comprising the above-mentioned materials were used, the same procedure as that in the example A1 was taken to fabricate each of the lithium secondary batteries of the examples A11 to A12.

COMPARATIVE EXAMPLE a1

The comparative example a1 was different from the example A1 only in the material of the positive electrode connecting member 11.

In the comparative example a1, the positive electrode connecting member 11 was fabricated by forming the nickel plating layer having the thickness of 0.002 mm outside the aluminum having the thickness of 0.25 mm. Except for the above, the same procedure as that in the example A1 was taken to fabricate the lithium secondary battery of the comparative example a1.

COMPARATIVE EXAMPLE a2

The comparative example a2 was different from the example A1 only in the material of the positive electrode connecting member 11.

In the comparative example a2, the positive electrode connecting member 11 was fabricated by forming the nickel plating layer 11c having the thickness of 0.002 mm outside the austenitic stainless steel of SUS316L having the thickness of 0.25 mm. Except for the above, the same procedure as that in the example A1 was taken to fabricate the lithium secondary battery of the comparative example a2.

COMPARATIVE EXAMPLES a3 TO a6

The comparative examples a3 to a6 were different from the example A1 only in the material of the positive electrode connecting member 11. Specifically, martensitic stainless steel in stead of austenitic or ferrite stainless steel was used as the stainless steel in the clad material.

In the comparative example a3, as the positive electrode connecting member 11, the clad material comprising the aluminum having the thickness of 0.05 mm and the martensitic stainless steel of SUS403 having the thickness of 0.20 mm, wherein the nickel plating layer having the thickness of 0.002 mm was formed on said stainless steel was used.

In the comparative example a4, as the positive electrode connecting member 11, the clad material comprising the aluminum having the thickness of 0.05 mm and the martensitic stainless steel of SUS410F2 having the thickness of 0.20 mm, wherein the nickel plating layer having the thickness of 0.002 mm was formed on said stainless steel was used.

In the comparative example a5, as the positive electrode connecting member 11, the clad material comprising the aluminum having the thickness of 0.05 mm and the martensitic stainless steel of SUS420J1 having the thickness of 0.20 mm, wherein the nickel plating layer having the thickness of 0.002 mm was formed on said stainless steel was used.

In the comparative example a6, as the positive electrode connecting member 11, the clad material comprising the aluminum having the thickness of 0.05 mm and the martensitic stainless steel of SUS420F2 having the thickness of 0.20 mm, wherein the nickel plating layer having the thickness of 0.002 mm was formed on said stainless steel was used.

Except that the positive electrode connecting members 11 comprising the above-mentioned materials were used, the same procedure as that in the example A1 was taken to fabricate each of the lithium secondary batteries of the comparative examples a3 to a6.

Each of the lithium secondary batteries in the examples A1 to A12 and the comparative examples a1 to a6 was charged to a charge end voltage of 4.2 V at a charge current of 100 $\mu$A under a temperature condition of 25° C., was then discharged to a discharge end voltage of 3 V at a discharge current of 100 $\mu$A to find a initial discharge capacity Qo.

Additionally, each of the above-mentioned batteries was charged to the charge end voltage of 4.2 V at the charge current of 100 µA, was then stored for 2 months under the temperature condition of 60° C., and thereafter, was discharged to the discharge end voltage of 3 V at the discharge current of 100 µA under the temperature condition of 25° C. to find the discharge capacity after storage Qa.

The percentage of capacity retention in each of the lithium secondary batteries of the examples A1 to A12 and comparative examples a1 to a6 was found based on the following equation. The results were shown in the following Table 1.

The percentage of capacity retention (%)=($Q_a/Q_o$)×100

TABLE 1

| | material and thickness (mm) of positive electrode connecting member | percentage of capacity retention (%) |
|---|---|---|
| example A1 | Al(0.05) + SUS316L(0.20) + Ni(0.002) | 95 |
| example A2 | Al(0.05) + SUS316L(0.20) | 94 |
| example A3 | Al(0.05) + SUS316(0.20) + Ni(0.002) | 94 |
| example A4 | Al(0.05) + SUS304(0.20) + Ni(0.002) | 90 |
| example A5 | Al(0.05) + SUS304L(0.20) + Ni(0.002) | 91 |
| example A6 | Al(0.05) + SUS201(0.20) + Ni(0.002) | 87 |
| example A7 | Al(0.05) + SUS310S(0.20) + Ni(0.002) | 88 |
| example A8 | Al(0.05) + SUS321(0.20) + Ni(0.002) | 85 |
| example A9 | Al(0.05) + SUS347(0.20) + Ni(0.002) | 86 |
| example A10 | Al(0.05) + SUSXM7(0.20) + Ni(0.002) | 84 |
| example A11 | Al(0.05) + SUS430(0.20) + Ni(0.002) | 93 |
| example A12 | Al(0.05) + SUS434(0.20) + Ni(0.002) | 92 |
| comparative example a1 | Al(0.25) + Ni(0.002) | 43 |
| comparative example a2 | SUS316L(0.25) + Ni(0.002) | 25 |
| comparative example a3 | Al(0.05) + SUS403(0.20) + Ni(0.002) | 15 |
| comparative example a4 | Al(0.05) + SUS410F2(0.20) + Ni(0.002) | 14 |
| comparative example a5 | Al(0.05) + SUS420J1(0.20) + Ni(0.002) | 10 |
| comparative example a6 | Al(0.05) + SUS420F2(0.20) + Ni(0.002) | 11 |

As apparent from the results, each of the lithium secondary batteries in the examples A1 to A10 in which the clad material comprising the aluminum 11a and the austenitic stainless steel 11b was used as the positive electrode connecting member 11 to which the positive electrode 1 was connected and each of the lithium secondary batteries of the examples A11 and A12 in which the clad material comprising the aluminum 11a and the ferrite stainless steel 11b was used as the positive electrode connecting member 11 to which the positive electrode 1 was connected presented a remarkably high percentage of the capacity retention and was improved in the storage characteristics of the lithium secondary battery compared with the lithium secondary batteries of the comparative examples a1 and a2 in which the clad material comprising the aluminum and the stainless steel was not used and each of the lithium secondary batteries of the comparative examples a3 to a6 in which the martensitic stainless steel was used as the stainless steel in the clad material.

Each of the lithium secondary batteries of the comparative examples a3 to a6 in which the clad material comprising the aluminum and the martensitic stainless steel was used presented a remarkably low percentage of the capacity retention because the resistance of the martensitic stainless steel toward the non-aqueous electrolyte solution is much lower compared with the austenitic stainless steel and the ferrite stainless steel, further, in the clad material comprising the aluminum and the martensitic stainless steel, a resistant alloy is not formed in the interface, thus when the aluminum inside the positive electrode connecting member 11 was damaged by the contact with the positive electrode current collector 5, the martensitic stainless steel was corroded away by the non-aqueous electrolyte solution.

EXAMPLES A13 TO A17

The examples A13 to A17 were different from the example A1 only in the material of the positive electrode connecting member 11. In the examples A13 to A17, in stead of the aluminum 11a in the clad material of the example A1, an alloy comprising the aluminum and manganese was used, and the amount of the manganese contained in the aluminum-manganese alloy was changed.

Specifically, the aluminum-manganese alloy containing 0.1 wt % of the manganese in the example A13, the aluminum-manganese alloy containing 0.5 wt % of the manganese in the example A14, the aluminum-manganese alloy containing 1 wt % of the manganese in the example A15, the aluminum-manganese alloy containing 5 wt % of the manganese in the example A16, and the aluminum-manganese alloy containing 10 wt % of the manganese in the example A17 was respectively used as shown in the following Table 2. Except for the above, the same procedure as that in the example A1 was taken to form each of the positive electrode connecting members 11.

Except that each of the positive electrode connecting members 11 thus formed was used, the same procedure as that in the example A1 was taken to fabricate each of the lithium secondary batteries of the examples A13 to A17.

The percentage of the capacity retention of each of the lithium secondary batteries of the examples A13 to A17 thus fabricated was found in the same manner as the example A1. The results were shown in the following Table 2.

TABLE 2 positive electrode connecting member:
Al or Al-Mn alloy (0.05) + SUS316L (0.20) + Ni (0.002)

| | amount of Mn in Al or Al—Mn alloy | percentage of capacity retention (%) |
|---|---|---|
| example A1 | — | 95 |
| example A13 | 0.1 wt % | 96 |
| example A14 | 0.5 wt % | 97 |
| example A15 | 1 wt % | 98 |
| example A16 | 5 wt % | 96 |
| example A17 | 10 wt % | 96 |

As a result, each of the lithium secondary batteries of the examples A13 to A17 using the aluminum-manganese alloy in the clad material for the positive electrode connecting member 11 presented rather a higher percentage of the capacity retention compared with the lithium secondary battery of the example A1 using the aluminum, thus the storage characteristics of the lithium secondary batteries was improved.

EXAMPLES A18 TO A21

The examples A18 to A21 were different from the example A1 only in the type of the solute to be dissolved in the mixed solvent containing ethylene carbonate(EC) and dimethyl carbonate(DMC) in a volume ratio of 1:1.

Specifically, lithium trifluoro methansulfonic acid imide LiN($CF_3SO_2$)$_2$ in the example A18, lithium pentafluoro ethanesulfonic acid imide $LiN(C_2F_5SO_2)_2$ in the example A19, lithium trifluoro methansulfonic acid methide $LiC(CF_3SO_2)_3$ in the example A20, and lithium trifluoro methansulfonic acid $LiCF_3SO_3$ in the example A21 was respectively used as the solute as shown in the following Table 3.

Each of the solutes was respectively dissolved in the mixed solvent, which was containing ethylene carbonate (EC) and dimethyl carbonate(DMC) in a volume ratio of 1:1, in a concentration of 1 mol/l to prepare each of the non-aqueous electrolyte solutions.

Except that each of the non-aqueous electrolyte solutions thus prepared was used, the same procedure as that in the example A1 was taken to fabricate each of the lithium secondary batteries of the examples A18 to A21.

The percentage of the capacity retention of each of the lithium secondary batteries of the examples A18 to A21 thus fabricated was found in the same manner as the example A1. The results were shown in the following Table 3.

TABLE 3 positive electrode connecting member:
Al (0.05) + SUS316L (0.20) + Ni (0.002)

| | type of solute in non-aqueous electrolyte solution | percentage of capacity retention (%) |
|---|---|---|
| example A1 | $LiPF_6$ | 95 |
| example A18 | $LiN(CF_3SO_2)_2$ | 65 |
| example A19 | $LiN(C_2F_5SO_2)_2$ | 62 |
| example A20 | $LiC(CF_3SO_2)_3$ | 60 |
| example A21 | $LiCF_3SO_3$ | 65 |

As a result, even in a case where the type of the solute of the non-aqueous electrolyte solution was changed as the case of the lithium secondary batteries of the examples A18 to A21, when the same clad material as that in the lithium secondary battery of the example A1 was used as the positive electrode connecting member 11, the percentage of the capacity retention was higher than that of each of the lithium secondary batteries of the comparative examples, thus the storage characteristics of the lithium secondary batteries was improved. When lithium hexafluorophosphate $LiPF_6$ was used as the solute in the mixed solvent as the case of the lithium secondary battery of the example A1, the percentage of the capacity retention was higher, thus the storage characteristics of the lithium secondary battery was further improved compared with the lithium secondary batteries of the examples A18 to A21 using each of the above-mentioned solutes.

EXAMPLES A22 TO A28

The examples A22 to A28 were different from the example A1 only in the type of the solvent used in the preparation of the non-aqueous electrolyte solution of the lithium secondary battery.

Specifically, the mixed solvent containing ethylene carbonate (EC) and diethyl carbonate (DEC) in a volume ratio of 1:1 in the example A22, the mixed solvent containing ethylene carbonate (EC) and ethyl methyl carbonate (EMC) in the volume ratio of 1:1 in the example A23, the mixed solvent containing ethylene carbonate (EC), dimethyl carbonate (DMC), and diethyl carbonate (DEC) in the volume ratio of 4:3:3 in the example A24, the mixed solvent containing propylene carbonate (PC) and dimethyl carbonate (DMC) in the volume ratio of 1:1 in the example A25, the mixed solvent containing butylene carbonate (BC) and dimethyl carbonate (DMC) in the volume ratio of 1:1 in the example A26, the mixed solvent containing vinylene carbonate (VC) and dimethyl carbonate (DMC) in the volume ratio of 1:1 in the example A27, and the mixed solvent containing γ-butyrolactone (γ-BL) and dimethyl carbonate (DMC) in the volume ratio of 1:1 in the example A28, was respectively used as shown in the following Table 4.

Lithium hexafluorophosphate $LiPF_6$ as the solute was dissolved in each of the above-mentioned mixed solvents in a concentration of 1 mol/l to prepare each of the non-aqueous electrolyte solutions.

Except that each of the non-aqueous electrolyte solutions thus prepared was used, the same procedure as that in the example A1 was taken to fabricate each of the lithium secondary batteries of the examples A22 to A28.

The percentage of the capacity retention of each of the lithium secondary batteries of the examples A22 to A28 thus fabricated was found in the same manner as the example A1. The results were shown in the following Table 4.

TABLE 4 positive electrode connecting member:
Al (0.05) + SUS316L (0.20) + Ni (0.002)

| | type and volume ratio of solvent of non-aqueous electrolyte solution | percentage of capacity retention (%) |
|---|---|---|
| example A1 | EC:DMC = 1:1 | 95 |
| example A22 | EC:DEC = 1:1 | 93 |
| example A23 | EC:EMC = 1:1 | 94 |
| example A24 | EC:DMC:DEC = 4:3:3 | 97 |
| example A25 | PC:DMC = 1:1 | 94 |
| example A26 | BC:DMC = 1:1 | 92 |
| example A27 | VC:DMC = 1:1 | 91 |
| example A28 | γ-BL:DMC = 1:1 | 90 |

As a result, even in a case where the type of the solvent of the non-aqueous electrolyte solution was changed as the case of the lithium secondary batteries of the examples A22 to A28, when the same clad material as that in the lithium secondary battery of the example A1 was used as the positive electrode connecting member 11, the percentage of the capacity retention was remarkably higher, thus the storage characteristics of the lithium secondary batteries was remarkably improved compared with each of the lithium secondary batteries of the comparative examples as the case of the lithium secondary battery of the example 1.

The second lithium secondary batteries according to the examples of the present invention will be specifically illustrated. Further, comparative examples will be taken to make it clear that the lithium secondary batteries of the examples are improved in charge/discharge cycle performance. It should be appreciated that the second lithium secondary batteries according to the present invention are not particularly limited to those in the following examples, and various changes and modifications may be made in the invention without departing from the spirit and scope thereof.

EXAMPLE B1

In the example B1, a positive electrode and a negative electrode fabricated in the following manner, and a non-aqueous electrolyte solution prepared in the following manner were used to fabricate a flat coin-type lithium secondary battery as shown in FIG. 1.

(Fabrication of Positive Electrode)

In fabricating the positive electrode, 85 parts by weight of $LiCoO_2$ powder as a positive electrode material, 10 parts by weight of carbon powder as a conductive agent, and 5 parts by weight of polyvinylidene fluoride as a binding agent were mixed to prepare a positive electrode mixture. N-methyl-2-pyrolidone was further added to the positive electrode mixture to prepare a slurry.

Figure 3:
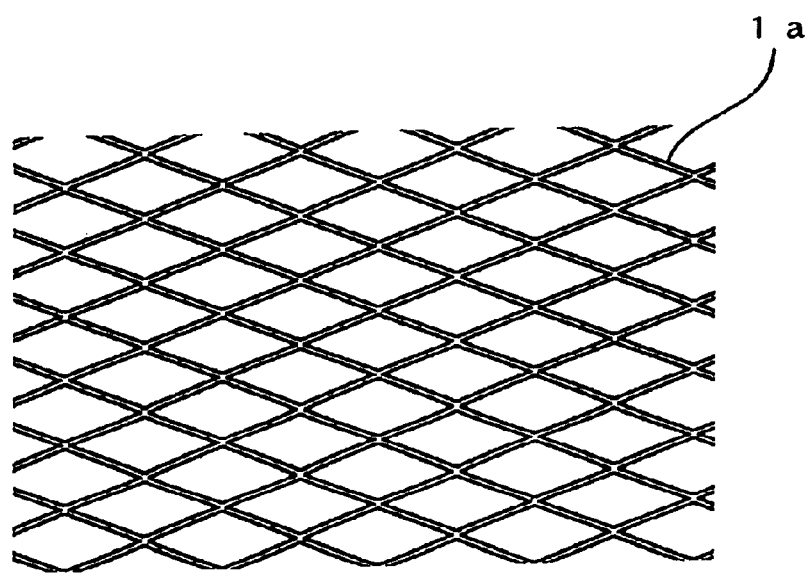
FIG. 3 is a plane view of a positive electrode current collector consisting of metal lath used in examples of a second lithium secondary battery.

As the positive electrode current collector 1a, the flat metal lath consisting of aluminum-manganese alloy (Al—Mn alloy) containing 1 wt % of manganese and having voidage of 20% and thickness of 250 μm as shown in FIG. 3 was used.

Subsequently, the above-mentioned paste was applied to one side of the positive electrode current collector 1a by means of the doctor blade coating method. The paste was dried at 150° C. and was then cut to obtain a disk-like positive electrode 1 having a diameter of 17 mm and thickness of 1.0 mm.

(Fabrication of Negative Electrode)

In fabricating the negative electrode, 95 parts by weight of natural graphite powder as a negative electrode material and 5 parts by weight of polyvinylidene fluoride as a binding agent were mixed to prepare a negative electrode mixture. N-methyl-2-pyrolidone was further added to the negative electrode mixture to prepare a slurry. Subsequently, the slurry was applied to one side of the negative electrode current collector made of copper 2a having thickness of 20 μm by means of the doctor blade coating method. The slurry on the negative electrode current collector was dried at 150° C. and was then cut to obtain a disk-like negative electrode 2 having the diameter of 17 mm and the thickness of 1.0 mm.

(Preparation of Non-Aqueous Electrolyte Solution)

In preparing the non-aqueous electrolyte solution, a mixed solvent containing ethylene carbonate and dimethyl carbonate in a volume ratio of 1:1 was used. Lithium hexafluorophosphate $LiPF_6$ as solute was dissolved in the mixed solvent in a concentration of 1 mol/l to prepare the non-aqueous electrolyte solution.

(Fabrication of Battery)

In fabricating a battery, as shown in FIG. 1, a microporous film made of polypropylene and impregnated with the above-mentioned non-aqueous electrolyte solution was interposed as a separator 3 between the positive electrode 1 and the negative electrode 2 respectively fabricated in the above-mentioned manners, after which they were contained in a battery case 10 comprising a positive electrode connecting member 11 to which the positive electrode was connected and a negative-electrode connecting member 12 to which the negative electrode 2 was connected, and the positive electrode 1 was connected to the positive electrode connecting member 11 via the positive electrode current collector 1a while the negative electrode 2 was connected to the negative electrode connecting member 12 via the negative electrode current collector 2b. A polypropylene insulation packing 13 was provided around the positive electrode connecting member 11 and the negative electrode connecting member 12, the positive electrode connecting member 11 was bent to seal the space between the positive electrode connecting member 11 and the negative electrode connecting member 12, then the positive electrode connecting member 11 and the negative electrode connecting member 12 were electrically insulated from each other by the insulating packing 13 to fabricate a lithium secondary battery having the diameter of 24 mm and the thickness of 3 mm.

The negative electrode connecting member 12 was fabricated by forming a nickel plating layer having the thickness of 0.002 mm outside the stainless steel of SUS304 having the thickness of 0.25 mm. As the positive electrode connecting member 11, the clad material comprising aluminum having the thickness of 0.05 mm and stainless steel of SUS316L having the thickness of 0.20 mm, wherein the nickel plating layer having the thickness of 0.002 mm was formed on said stainless steel was used.

EXAMPLES B2 TO B6

The examples B2 to B6 were different from the example B1 only in the type of the positive electrode current collector 1a used in the fabrication of the positive electrode of the lithium secondary battery.

In the example B2, as the positive electrode current collector 1a, the wire lath consisting of the aluminum-manganese alloy (Al—Mn alloy) which was containing 1 wt % of manganese, and having voidage of 10% and thickness of 500 μm was used.

In the example B3, as the positive electrode current collector 1a, the sintered member consisting of the aluminum-manganese alloy (Al—Mn alloy) which was containing 1 wt % of manganese, and having the voidage of 50% and thickness of 100 μm was used.

In the example B4, as the positive electrode current collector 1a, the foamed member consisting of the aluminum-manganese alloy (Al—Mn alloy) which was containing 1 wt % of manganese, and having pore diameter of 500 μm, voidage of 10%, and thickness of 500 μm was used.

In the example B5, as the positive electrode current collector 1a, an aggregation of wire material, which was formed by winding at random the wire consisting of the aluminum-manganese alloy (Al—Mn alloy) containing 1 wt % of manganese and having the diameter of 100 μm, and which was having the voidage of 5% and thickness of 1 mm was used.

In the example B6, as the positive electrode current collector 1a, the network member, which was made of the wire material consisting of the aluminum-manganese alloy (Al—Mn alloy) containing 1 wt % of manganese, and which was having the size of the scale division of 400 μm and of 50-mesh was used.

Except that each of the positive electrode current collectors thus formed was used, the same procedure as that in the example B1 was taken to fabricate each of the lithium secondary batteries of the examples B2 to B6.

COMPARATIVE EXAMPLE b1

The comparative example b1 was different from example B1 only in the type of the positive electrode current collector 1a used in the fabrication of the positive electrode of the lithium secondary battery.

In the comparative example b1, as the positive electrode current collector 1a, the foil consisting of the aluminum-manganese alloy (Al—Mn alloy) which was containing 1 wt % of manganese, and having the thickness of 50 μm was used. Except for the above, the same procedure as that in the example B1 was taken to fabricate the lithium secondary battery of the comparative example b1.

COMPARATIVE EXAMPLE b2

The comparative example b2 was different from example B1 only in the type of the positive electrode current collector 1a used in the fabrication of the positive electrode of the lithium secondary battery.

In the comparative example b2, as the positive electrode current collector 1a, the aluminum foamed member having the pore diameter of 500 μm, the voidage of 10%, and the thickness of 500 μm was used. Except for the above, the same procedure as that in the example B1 was taken to fabricate the lithium secondary battery of the comparative example b2.

COMPARATIVE EXAMPLE b3

The comparative example b3 was different from example B1 only in the type of the positive electrode current collector 1a used in the fabrication of the positive electrode of the lithium secondary battery.

In the comparative example b3, as the positive electrode current collector 1a, the aluminum metal lath having the voidage of 20% and the thickness of 250 μm was used. Except for the above, the same procedure as that in the example B1 was taken to fabricate the lithium secondary battery of the comparative example b3.

COMPARATIVE EXAMPLE b4

The comparative example b4 was different from example B1 only in the type of the positive electrode current collector 1a used in the fabrication of the positive electrode of the lithium secondary battery.

In the comparative example b4, as the positive electrode current collector 1a, the metal lath consisting of aluminum-copper alloy (Al—Cu alloy) which was containing 1 wt % of copper, and having the voidage of 20% and the thickness of 250 μm was used. Except for the above, the same procedure as that in the example B1 was taken to fabricate the lithium secondary battery of the comparative example b4.

COMPARATIVE EXAMPLE b5

The comparative example b5 was different from example B1 only in the type of the positive electrode current collector 1a used in the fabrication of the positive electrode of the lithium secondary battery.

In the comparative example b5, as the positive electrode current collector 1a, the metal lath consisting of aluminum-magnesium alloy (Al—Mg alloy) which was containing 1 wt % of magnesium, and having the voidage of 20% and the thickness of 250 μm was used. Except for the above, the same procedure as that in the example B1 was taken to fabricate the lithium secondary battery of the comparative example b5.

COMPARATIVE EXAMPLE b6

The comparative example b6 was different from example B1 only in the type of the positive electrode current collector 1a used in the fabrication of the positive electrode of the lithium secondary battery.

In the comparative example b6, as the positive electrode current collector 1a, the metal lath consisting of aluminum-zinc alloy (Al—Zn alloy) which was containing 1 wt % of zinc, and having the voidage of 20% and the thickness of 250 μm was used. Except for the above, the same procedure as that in the example B1 was taken to fabricate the lithium secondary battery of the comparative example b6.

Each of the lithium secondary batteries in the examples B1 to B6 and comparative examples b1 to b6 was charged to a charge end voltage of 4.2 V at a charge current of 100 μA under a temperature condition of 25° C., was then discharged to a discharge end voltage of 3 V at a discharge current of 100 μA to find a discharge capacity Q1 in the first cycle.

The above-mentioned charge/discharge was considered as one cycle. 50 cycles of the charge/discharge were performed to each of the above-mentioned lithium secondary batteries to find a discharge capacity Q50 at the $50^{th}$ cycle. The percentage of capacity retention at the $50^{th}$ cycle was calculated based on the following equation. The results were shown in the following Table 5.

The percentage of capacity retention (%)=$(Q50/Q1) \times 100$

TABLE 5

| | type of positive electrode current collector | | percentage of capacity retention |
|---|---|---|---|
| | form | component | (%) |
| example B1 | metal lath | Al—Mn alloy (Mn:1 wt %) | 95 |
| example B2 | lath | Al—Mn alloy (Mn:1 wt %) | 95 |
| example B3 | sintered member | Al—Mn alloy (Mn:1 wt %) | 94 |
| example B4 | foamed member | Al—Mn alloy (Mn:1 wt %) | 92 |
| example B5 | aggregation of wire material | Al—Mn alloy (Mn:1 wt %) | 91 |
| example B6 | network member | Al—Mn alloy (Mn:1 wt %) | 91 |
| comparative example b1 | foil | Al—Mn alloy (Mn:1 wt %) | 83 |
| comparative example b2 | foamed member | Al | 85 |
| comparative example b3 | metal lath | Al | 83 |
| comparative example b4 | metal lath | Al—Cu alloy (Cu:1 wt %) | 83 |
| comparative example b5 | metal lath | Al—Mg alloy (Mg:1 wt %) | 82 |
| comparative example b6 | metal lath | Al—Zn alloy (Zn:1 wt %) | 81 |

As apparent from the results, each of the lithium secondary batteries in the examples B1 to B6 in which the positive electrode current collector 1a consisting of the aluminum-manganese alloy which was containing 1 wt % of manganese, and having the form of the metal lath, the wire lath, the sintered member, the foamed member, the aggregation of wire material, and the network member which were having a filling space was used presented a high percentage of the capacity retention after 50 cycles, thus was improved in the charge/discharge cycle performance compared with the lithium secondary battery of the comparative example b1 using the positive electrode current collector 1a comprising the foil which was consisting of the aluminum-manganese alloy (Al—Mn alloy) which was containing 1 wt % of manganese, and which did not have the filling space, the lithium secondary battery of the comparative example b2 using the positive electrode current collector 1a having the filling space and consisting only of aluminum, and each of the lithium secondary batteries of the comparative examples b3 to b6 using the positive electrode current collector 1a having the filling space and consisting of the aluminum alloy which did not contain manganese.

EXAMPLES B7 TO B10

The examples B7 to B10 were different from the example B1 only in that the metal lath in which the amount of the manganese contained in the aluminum-manganese alloy was changed was used as the positive electrode current collector 1a in the fabrication of the positive electrode of the lithium secondary battery. Except for the above, the same procedure as that in the example B1 was taken to fabricate each of the lithium secondary batteries of the examples B7 to B10.

As the aluminum-manganese alloy constituting the positive electrode current collector 1a, the aluminum-manganese alloy containing 0.1 wt % of manganese in the example B7, the aluminum-manganese alloy containing 0.5 wt % of manganese in the example B8, the aluminum-manganese alloy containing 5 wt % of manganese in the example B9, and the aluminum-manganese alloy containing 10 wt % of manganese in the example B10 was respectively used.

The percentage of the capacity retention at $50^{th}$ cycle of each of the lithium secondary batteries of the examples B7 to B10 using the above-mentioned positive electrode current collectors $1a$ was found in the same manner as the example B1. The results were shown in the following Table 6.

TABLE 6

| | type of positive electrode current collector | | percentage of capacity retention (%) |
|---|---|---|---|
| | form | amount of Mn in Al—Mn alloy | |
| example B7 | metal lath | 0.1 wt % | 91 |
| example A2 | metal lath | 0.5 wt % | 93 |
| example B8 | metal lath | 1 wt % | 95 |
| example B9 | metal lath | 5 wt % | 94 |
| example B10 | metal lath | 10 wt % | 91 |

As a result, each of the lithium secondary batteries of the examples B7 to B10 using the metal lath consisting of the aluminum-manganese alloy in which the amount of manganese was 0.1 to 10 wt % as the positive electrode current collector $1a$ presented a high percentage of the capacity retention after 50 cycles, thus was improved in the charge/discharge cycle performance as the case of the lithium secondary battery of the example B1 compared with each of the lithium secondary batteries of the comparative examples b1 to b6. Especially, the lithium secondary batteries of the examples B1, B8 and B9 using the metal lath in which the amount of the manganese in the aluminum-manganese alloy was 0.5 to 5 wt % as the positive electrode current collector $1a$ presented a higher percentage of the capacity retention after 50 cycles, thus were further improved in the charge/discharge cycle performance. When the aluminum-manganese alloy in which the amount of the manganese was not more than 0.1 wt % was used to constitute the positive electrode current collector $1a$, the strength of the positive electrode current collector $1a$ was so weak that $1a$ was easily ruined, thus the fabrication of the positive electrode 1 was difficult. On the other hand, when the aluminum-manganese alloy in which the amount of the manganese 20 wt % was used to constitute the positive electrode current collector $1a$, the positive electrode current collector $1a$ corroded away during the charge of the lithium secondary battery, thus charge/discharge was not performed properly.

EXAMPLES B11 TO B14

The examples B11 to B14 were different from the example B1 only in that the metal lath consisting of aluminum-manganese-copper alloy (Al—Mn—Cu alloy) which was containing copper in addition to manganese, and having the voidage of 20% and the thickness of 250 μm was used as the positive electrode current collector $1a$, and the amount of the copper contained in the aluminum-manganese-copper alloy was respectively changed. Except for the above, the same procedure as that in the example B1 was taken to fabricate each of the lithium secondary batteries of the examples B11 to B14.

As the aluminum-manganese-copper alloy constituting the positive electrode current collector $1a$, the aluminum-manganese-copper alloy containing 1 wt % of manganese and 0.1 wt % of copper in the example B11, the aluminum-manganese-copper alloy containing 1 wt % of manganese and 0.5 wt % of copper in the example B12, the aluminum-manganese-copper alloy containing 1 wt % of manganese and 1 wt % of copper in the example B13, and the aluminum-manganese-copper alloy containing 1 wt % of manganese and 2 wt % of copper in the example B14 was respectively used.

The percentage of the capacity retention at $50^{th}$ cycle of each of the lithium secondary batteries of the examples B11 to B14 using the above-mentioned positive electrode current collectors $1a$ was found in the same manner as the example B1. The results were shown in the following Table 7.

TABLE 7

| | type of positive electrode current collector | | percentage of capacity retention (%) |
|---|---|---|---|
| | form | amount of Mn and Cu in Al alloy | |
| example B1 | metal lath | Mn:1 wt %, Cu:0 wt % | 95 |
| example B11 | metal lath | Mn:1 wt %, Cu:0.1 wt % | 97 |
| example B12 | metal lath | Mn:1 wt %, Cu:0.5 wt % | 97 |
| example B13 | metal lath | Mn:1 wt %, Cu:1 wt % | 97 |
| example B14 | metal lath | Mn:1 wt %, Cu:2 wt % | 95 |

As a result, each of the lithium secondary batteries of the examples B11 to B14 using the metal lath consisting of the aluminum-manganese-copper alloy (Al—Mn—Cu alloy) which was containing copper in addition to manganese as the positive electrode current collector $1a$ presented a high percentage of the capacity retention after 50 cycles, thus was improved in the charge/discharge cycle performance as the case of the lithium secondary battery of the example B1 compared with the lithium secondary battery of the comparative examples b1 to b6. Especially, the lithium secondary batteries of the examples B11 to B13 using the positive electrode current collector $1a$ in which the amount of copper contained in the aluminum-manganese-copper alloy was in the range of 0.1 to 1 wt % presented a higher percentage of the capacity retention after 50 cycles, thus were further improved in the charge/discharge cycle performance compared with the lithium secondary battery of the example B1.

EXAMPLES B15 TO B18

In the examples B15 to B18, as the positive electrode current collector $1a$, the metal lath consisting of aluminum-manganese-magnesium alloy (Al—Mn—Mg alloy) which was containing magnesium in addition to manganese, and having the voidage of 20% and the thickness of 250 μm was used, and the amount of the magnesium contained in the aluminum-manganese-magnesium alloy was respectively changed. Except for the above, the same procedure as that in the example B1 was taken to fabricate each of the lithium secondary batteries of the examples B15 to B18.

As the aluminum-manganese-magnesium alloy constituting the positive electrode current collector $1a$, the aluminum-manganese-magnesium alloy containing 1 wt % of manganese and 0.1 wt % of magnesium in the example B15, the aluminum-manganese-magnesium alloy containing 1 wt % of manganese and 0.5 wt % of magnesium in the example B16, the aluminum-manganese-magnesium alloy containing 1 wt % of manganese and 1 wt % of magnesium in the example B17, and the aluminum-manganese-magnesium alloy containing 1 wt % of manganese and 2 wt % of magnesium in the example B18 was respectively used.

The percentage of the capacity retention at 50$^{th}$ cycle of each of the lithium secondary batteries of the examples B15 to B18 using the above-mentioned positive electrode current collectors 1a was found in the same manner as the example B1. The results were shown in the following Table 8.

TABLE 8

| | type of positive electrode current collector | | percentage of capacity retention (%) |
|---|---|---|---|
| | form | amount of Mn and Mg in Al alloy | |
| example B1 | metal lath | Mn:1 wt%, Mg:0 wt % | 95 |
| example B15 | metal lath | Mn:1 wt%, Mg:0.1 wt % | 96 |
| example B16 | metal lath | Mn:1 wt%, Mg:0.5 wt % | 97 |
| example B17 | metal lath | Mn:1 wt%, Mg:1 wt % | 96 |
| example B18 | metal lath | Mn:1 wt%, Mg:2 wt % | 95 |

As a result, each of the lithium secondary batteries of the examples B15 to B18 using the metal lath consisting of the aluminum-manganese-magnesium alloy which was containing magnesium in addition to manganese as the positive electrode current collector 1a presented a high percentage of the capacity retention after 50 cycles, thus was improved in the charge/discharge cycle performance as the case of the lithium secondary battery of the example B1 compared with the lithium secondary batteries of the comparative examples b1 to b6. Especially, the lithium secondary batteries of the examples B15 to B17 using the positive electrode current collector 1a in which the amount of the magnesium contained in the aluminum-manganese-magnesium alloy was in the range of 0.1 to 1 wt % presented a higher percentage of the capacity retention after 50 cycles, thus were further improved in the charge/discharge cycle performance compared with the lithium secondary battery of the example B1.

EXAMPLES B19 TO B22

In the examples B19 to B22, as the positive electrode current collector 1a, the metal lath consisting of aluminum-manganese-zinc alloy (Al—Mn—Zn alloy) which was including zinc in addition to manganese, and having the voidage of 20% and the thickness of 250 μm was used, and the amount of the zinc contained in the aluminum-manganese-zinc alloy was respectively changed. Except for the above, the same procedure as that in the example B1 was taken to fabricate each of the lithium secondary batteries of the examples B19 to B22.

As the aluminum-manganese-zinc alloy constituting the positive electrode current collector 1a, the aluminum-manganese-zinc alloy containing 1 wt % of manganese and 0.1 wt % of zinc in the example B19, the aluminum-manganese-zinc alloy containing 1 wt % of manganese and 0.5 wt % of zinc in the example B20, the aluminum-manganese-zinc alloy containing 1 wt % of manganese and 1 wt % of zinc in the example B21, and the aluminum-manganese-zinc alloy containing 1 wt % of manganese and 2 wt % of zinc in the example B22 was respectively used.

The percentage of the capacity retention at 50$^{th}$ cycle of each of the lithium secondary batteries of the examples B19 to B22 using the above-mentioned positive electrode current collectors 1a was found in the same manner as the example B1. The results were shown in the following Table 9.

TABLE 9

| | type of positive electrode current collector | | percentage of capacity retention (%) |
|---|---|---|---|
| | form | amount of Mn and Zn in Al alloy | |
| example B1 | metal lath | Mn:1 wt %, Zn:0 wt % | 95 |
| example B19 | metal lath | Mn:1 wt %, Zn:0.1 wt % | 96 |
| example B20 | metal lath | Mn:1 wt %, Zn:0.5 wt % | 96 |
| example B21 | metal lath | Mn:1 wt %, Zn:1 wt % | 96 |
| example B22 | metal lath | Mn:1 wt %, Zn:2 wt % | 95 |

As a result, each of the lithium secondary batteries of the examples B19 to B22 using the metal lath consisting of the aluminum-manganese-zinc alloy which was containing zinc in addition to manganese as the positive electrode current collector 1a presented a high percentage of the capacity retention after 50 cycles, thus was improved in the charge/discharge cycle performance as the case of the lithium secondary battery of the example B1 compared with the lithium secondary battery of the comparative examples b1 to b6. Especially, the lithium secondary batteries of the examples B19 to B22 using the positive electrode current collector 1a in which the amount of zinc contained in the aluminum-manganese-zinc alloy was in the range of 0.1 to 1 wt % presented a higher percentage of the capacity retention after 50 cycles, thus were further improved in the charge/discharge cycle performance compared with the lithium secondary battery of the example B1.

In the above-mentioned lithium secondary batteries of each of the examples, a flat coin-type lithium secondary battery was fabricated using the positive electrode 1 formed by applying the positive electrode material to one side of the positive electrode current collector 1a. However, the form of the lithium secondary battery is not especially limited. Examples of other lithium secondary batteries include a lithium secondary battery, which is not shown in the figures, fabricated by interposing a separator between a positive electrode, which is formed by applying the positive electrode material on both sides of a long positive electrode current collector, and a negative electrode, coiling the electrodes up, and placing the electrodes in a battery case. Such lithium secondary battery is also improved in the charge/discharge cycle performance when the above-mentioned positive electrode current collector is used.

Although the present invention has been fully described by way of examples, it is to be noted that various changes and modifications will be apparent to those skilled in the art. Therefore, unless otherwise such changes and modifications depart from the scope of the present invention, they should be construed as being included therein.

What is claimed is:

1. A lithium secondary battery comprising at least a positive electrode, a negative electrode, and a non-aqueous electrolyte in a battery case in which a positive electrode connecting member to which the positive electrode is connected and a negative electrode connecting member to which the negative electrode is connected are electrically separated, wherein said positive electrode connecting member is composed of clad material comprising (1) one of aluminum and aluminum alloy and (2) one of austenitic stainless steel and ferrite stainless steel, and the aluminum or aluminum alloy in the clad material is on the positive electrode side.

2. The lithium secondary battery according to claim 1, wherein the aluminum alloy in said clad material is aluminum-manganese alloy.

3. The lithium secondary battery according to claim 1, wherein a nickel plating layer is formed on the austenitic stainless steel or the ferrite stainless steel in said clad material.

4. The lithium secondary battery according to claim 1, wherein the austenitic stainless steel in said clad material is at least one member selected from a group consisting of SUS316L, SUS316, SUS304L, and SUS304.

5. The lithium secondary battery according to claim 1, wherein the ferrite stainless steel in said clad material is at least one member selected from the group consisting of SUS430 and SUS434.

6. The lithium secondary battery according to claim 1, wherein a positive electrode material in said positive electrode is at least one member selected from the group consisting of cobalt-lithium oxide, nickel-lithium oxide, and manganese-lithium oxide having spinel structure.

* * * * *